Patented Oct. 31, 1933

1,933,236

UNITED STATES PATENT OFFICE 1,933,236

PREPARATION OF AMINO-ANTHRAQUINONES

Alexander John Wuertz, Wilmington, Del., assignor to E. I. du Pont de Nemours & Company, Wilmington, Del., a corporation of Delaware No Drawing. Application June 30, 1931
Serial No. 548,035

16 Claims. (Cl. 260—60)

This invention relates to the preparation of carbon compounds and more particularly to the preparation of amino-anthraquinones. It especially contemplates the ammonolysis of anthraquinone sulphonic acids.

This invention has for an object the preparation of amino-anthraquinones by new chemical processes. Other objects are the preparation of amino-anthraquinones in a very pure state, in high yields, by processes which are simple and which may be readily carried out. A still further object is an advancement of the art. Other objects will appear hereinafter.

These objects are accomplished by the treatment of anthraquinone sulphonic acids with strong aqueous solutions of ammonia in the presence of an alkali metal nitrate and an inorganic oxidant. When desired a catalyst may also be present.

The invention will be further understood from a consideration of the following examples, in which the parts are given by weight.

Example I

Preparation of beta-amino-anthraquinone

Into a suitable autoclave there was charged 434 parts of the sodium salt of beta-anthraquinone-sulphonic-acid, 90 parts of potassium chlorate, and 75 parts of ammonium nitrate. Thereafter 2170 parts of 28% aqueous ammonia solution were added and the autoclave closed. The temperature was then gradually raised to 170° C. and maintained at about that point for approximately 36 hours. Thereafter the charge was transferred to a suitable distillation apparatus where it was made alkaline and the ammonia remaining distilled off. The beta-amino-anthraquinone produced in the process was isolated by filtration, washed free of the mother liquor, and dried. No further purification steps were necessary due to the high purity of the product. A very high yield was obtained.

Example II

Preparation of beta-amino-anthraquinone

Four hundred and thirty-four (434) parts of the sodium salt of beta-anthraquinone-sulphonic-acid, 90 parts of potassium chlorate, 75 parts of ammonium nitrate, and 2.5 parts of cuprous oxide were placed in an autoclave. Two thousand one hundred seventy (2170) parts of 28% aqueous ammonia were then added and the autoclave closed. The temperature was gradually raised to 170° C. and there maintained for approximately 36 hours. Thereafter the charge was transferred to a suitable distillation apparatus where it was made alkaline and the ammonia remaining was recovered by distillation. The beta-amino-anthraquinone produced in the process was isolated by filtration, washed free of the mother liquor, and dried. No further purification steps were necessary because of the high purity of the product. A very high yield was obtained.

Example III

Preparation of alpha-amino-anthraquinone

In an autoclave there was placed 434 parts of the sodium salt of alpha-anthraquinone-sulphonic-acid, 90 parts of potassium chlorate, and 75 parts of ammonium nitrate. To this mixture there was added 2170 parts of aqueous ammonia solution and the autoclave closed. The mixture was gradually heated until the temperature had reached 170° C., at which point it was maintained for approximately 36 hours. The charge was then transferred to a suitable apparatus, made alkaline with potassium hydroxide, and the ammonia present distilled off. The resultant alpha-amino-anthraquinone was isolated by filtration. After washing free of mother liquor and drying, a product of such purity that no further purification steps were necessary was obtained. A very high yield of the product was produced.

Example IV

Preparation of 2:6-di-amino-anthraquinone

Into a suitable autoclave there was charged 434 parts of the sodium salt of 2:6-anthraquinone-di-sulphonic-acid, 126 parts of potassium chlorate, and 105 parts of ammonium nitrate. To this mixture there was added 3000 parts of 28% aqueous ammonia, the autoclave closed and the temperature gradually raised to 180° C. After maintaining this temperature for approximately 20 hours, the charge was transferred to a distillation apparatus, made alkaline with sodium hydroxide, and the remaining ammonia distilled off. After isolation by filtration, washing free of the mother liquor, and drying, the 2:6-di-amino-anthraquinone obtained was found to be sufficiently pure so as not to require further purification. A satisfactory yield of this product was obtained.

Example V

Preparation of beta-amino-anthraquinone

A charge of materials consisting of 434 parts of the sodium salt of beta-anthraquinone-sulphonic-acid, 90 parts of potassium chlorate, 90 parts of ammonium nitrate, and 2 parts of reduced copper was placed in a suitable autoclave and treated as set out in Example I. Results similar to those in Examples I and II were obtained.

The invention is not limited to the precise details set out in the above examples. In general, any anthraquinone containing as a substituent a sulphonic group may be utilized. The results obtainable in the preparation of beta-amino-anthraquinone, 1:5-di-amino-anthraquinone, 2:7 di-amino-anthraquinone and 1:8-di-amino-anthraquinone from the corresponding anthraquinone-sulphonic acids or their alkali metal salts merit special mention.

It is to be understood that for purposes of this invention the anthraquinone sulphonic acids and their alkali metal salts are regarded as equivalents.

The temperatures at which the processes are carried out, as will be obvious to one skilled in the art, depend upon the particular anthraquinone-sulphonic-acid used and the other ingredients of the reaction mass. In general, the preferred range is from 150° C. to 220° C.

In carrying out the processes the chlorates may be replaced by other compounds, such as perborates, perchlorates, dichromates and the like. Very good results are obtained by replacing the chlorates with calculated quantities of salts of perchloric acid.

Because of its availability, potassium chlorate is generally used, but it is to be understood that the corresponding salts of other alkali metals give equivalent results.

In the examples ammonium nitrate has been used. This may be replaced by other alkali metal nitrates, for example, sodium nitrate.

The strength of the aqueous ammonia solution may be varied, but preferably the concentration is that corresponding to a 20 to 50% ammonia ($NH_3$) content. With decreasing concentration of the ammonium hydroxide solution increasing temperatures may be used advantageously.

In general, for any given ammonia concentration the use of higher temperatures causes completion of the reaction in a shorter time.

The invention is not limited to the use of metallic copper nor any particular copper salt as a catalyst. Other metals or metal salts, for instance, the salts of the metals or the metals themselves which follow copper in the electromotive series may be used effectively. Special mention may be made of copper nitrate, cuprous oxide and silver chloride.

By the term "reduced copper" it is intended to cover metallic copper in any physical form, preferably precipitated copper in the form of a fine copper powder or sponge.

Throughout the specification and claims where the term "alkali metal" is used it is intended to cover the ammonium radical ($NH_4$) —, because it reacts similarly to the corresponding sodium and potassium compounds.

The process of this invention has several very important and distinct advantages over any process known to the prior art. Among these may be mentioned the facts that the yields of amino-anthraquinones obtained are substantially theoretical, that the products of the process are so pure as to render unnecessary special purification steps, that the processes may be carried out at lower temperatures than heretofore deemed possible, and that the quantities of materials per charge can be greatly increased in proportion to the ammonia content of the autoclave. This last mentioned advantage is of particular importance in commercial processes.

As many apparently widely different embodiments of this invention may be made without departing from the spirit and scope thereof, it is to be understood that I do not limit mself to the specific embodiments thereof except as defined in the appended claims.

I claim:

1. The process which comprises treating beta-anthraquinone-sulphonic-acid or an alkali metal salt thereof with aqueous ammonia in the presence of potassium chlorate and ammonium nitrate at a temperature of about 170° C.

2. The process which comprises heating an anthraquinone nucleus having as a substituent a sulphonic radical with aqueous ammonia in the presence of an inorganic oxidizing salt soluble in an aqueous ammonia and a nitrate.

3. The process which comprises heating an anthraquinone nucleus having as a substituent a sulphonic radical with aqueous ammonia in the presence of an inorganic oxidizing salt soluble in aqueous ammonia, a nitrate and a catalyst taken from the group consisting of copper and its salts, and the metals which follow copper in the electromotive series and their salts.

4. The process which comprises heating an anthraquinone nucleus having as a substituent a sulphonic radical with aqueous ammonia in the presence of an inorganic oxidizing salt soluble in aqueous ammonia, a nitrate and a copper catalyst.

5. The process which comprises heating an anthraquinone nucleus having as a substituent a sulphonic radical with aqueous ammonia in the presence of a chlorate and a nitrate.

6. The process which comprises heating an anthraquinone nucleus having as a substituent a sulphonic radical with aqueous ammonia in the presence of an alkali metal chlorate and an alkali metal nitrate.

7. The process which comprises heating an anthraquinone nucleus having as a substituent a sulphonic radical with aqueous ammonia in the presence of potassium chlorate and a nitrate.

8. The process which comprises heating an anthraquinone nucleus having as a substituent a sulphonic radical with aqueous ammonia in the presence of potassium chlorate and ammonium nitrate.

9. The process of claim 2 characterized in that the reaction is carried out under pressure.

10. The process of claim 2 characterized in that the reaction is carried out in an autoclave.

11. The process which comprises heating an anthraquinone nucleus having as a substituent a sulfonic radical with aqueous ammonia in the presence of an inorganic oxidizing salt soluble in aqueous ammonia and a catalyst taken from the group consisting of copper and its salts, and the metals which follow copper in the electromotive series and their salts.

12. A process which comprises heating an anthraquinone nucleus having as a substituent a sulphonic radical, with aqueous ammonia in the presence of an inorganic oxidizing salt soluble in ammonia and ammonium nitrate.

13. The process of producing a beta-amino-anthraquinone which comprises heating an anthraquinone nucleus having as a beta substituent a sulphonic acid radical, with aqueous ammonia in the presence of an alkali metal chlorate, ammonium nitrate and a copper catalyst.

14. The process of producing beta-aminoanthraquinone which comprises heating a compound selected from the group consisting of beta-anthraquinone-sulphonic-acid and alkali metal salts thereof, with aqueous ammonia in the presence of an alkali metal chlorate, ammonium nitrate and a copper catalyst.

15. The process of producing an alpha-aminoanthraquinone which comprises heating an anthraquinone nucleus having as an alpha substituent a sulphonic radical, with aqueous ammonia in the presence of an alkali metal chlorate and ammonium nitrate.

16. A process of producing alpha-aminoanthraquinone which comprises heating a compound selected from the group consisting of alpha-anthraquinone-sulphonic-acid and alkali metal salts thereof, with aqueous ammonia in the presence of an alkali metal chlorate and ammonium nitrate.

A. J. WUERTZ.